United States Patent [19]
Sanders

[11] 3,867,995
[45] Feb. 25, 1975

[54] HIGH DENSITY SOUND TRANSMISSION LOSS SYSTEM

[75] Inventor: Guy J. Sanders, Rolling Hills Estate, Calif.

[73] Assignee: Fair Company, El Segundo, Calif.

[22] Filed: Mar. 1, 1974

[21] Appl. No.: 447,136

[52] U.S. Cl............ 181/33 G, 52/145, 52/405, 52/599
[51] Int. Cl............................................. E04b 1/84
[58] Field of Search ............ 181/33 G; 52/125, 144, 52/145, 404–407, 598, 599

[56] References Cited
UNITED STATES PATENTS

| | | | |
|---|---|---|---|
| 1,915,896 | 6/1933 | Maul | 52/599 |
| 1,983,020 | 12/1934 | De Vol | 52/405 X |
| 2,220,349 | 11/1940 | Plumb | 52/144 |
| 2,553,363 | 5/1951 | Droeger | 181/33 G UX |
| 2,902,854 | 9/1959 | Greene | 181/33 G UX |
| 3,435,580 | 4/1969 | Merrill et al. | 52/405 |
| 3,656,577 | 4/1972 | Larrsson et al. | 181/33 G |
| 3,742,660 | 7/1973 | Bierweiler | 52/125 X |

Primary Examiner—Richard B. Wilkinson
Assistant Examiner—John E. Gonzales
Attorney, Agent, or Firm—Lyon & Lyon

[57] ABSTRACT

Disclosed herein is a high density sound transmission loss panel for constructing soundproof enclosures. Each panel is comprised of a steel base and side plates, a layer of concrete which is disposed between the side plates and anchored to the base plate, a layer of sound absorbing materials disposed over the concrete and an interior perforated sheet which is positioned over the sound absorbing material and affixed to the interior ends of the side plates. Adjacent panels are secured together to form enclosures by welding of otherwise securing together the side plates of adjacent panels to form sound type joints therebetween.

18 Claims, 9 Drawing Figures

PATENTED FEB 25 1975 3,867,995

HIGH DENSITY SOUND TRANSMISSION LOSS SYSTEM

BACKGROUND OF THE INVENTION

In recent years great efforts have been made toward reducing environmental pollution and with increasing concern, attention is focusing on nosie pollution. Immobile sources of such pollution such as gas turbines can generally be placed in soundproof enclosures to reduce the noise generated thereby. Such enclosures, however, are generally quite massive as the transmission loss effected by the enclosure is primarily a function of the mass of the walls thereof which raises several economic problems. Many such soundproof enclosures are constructed of steel. Steel, however, is quite expensive and to obtain the desired amount of transmission loss it is necessary for an enclosure constructed of steel to have walls on the order of 2 inches thick. Such requirements necessarily make steel enclosures extremely expensive. In addition, such structures require the use of stiffeners or other structural support beams to give the walls additional strength and support thereby further increasing the cost of soundpoof steel enclosures.

An alternative to steel in the construction of such enclosures is the use of concrete. Approximately seven inches of concrete has the same mass and hence transmission loss as the two inch thick steel walls described above and is considerably less expensive. However, as steel, concrete has several shortcomings. It is difficult to form into complex shapes and concrete requires on-the-job pouring which necessitates the use of construction labor which is quite expensive. To reduce the costs of these massive soundproof enclosures it would be highly desirable to be able to use concrete in the manufacture of these enclosures in a manner which would facilitate construction and allow for the use of manufacturing labor as opposed to the more expensive construction labor. This is achieved through the use of the high density sound transmission loss panels hereinafter to be described.

SUMMARY OF THE INVENTION

Briefly, the invention comprises a panel which can be joined together with similar panels to form soundproof enclosures. Each panel has steel base and side portions and a layer of concrete which is anchored to the steel base portion. At least one layer of sound absorbing material is disposed over the concrete to further attenuate the sound through sound absorption. The absorbing material is held against the layer of concrete by a perforated facing which together with similar facings on adjacent panels form the interior of the enclosure. Each perforated facing is welded or otherwise affixed to the steel sidewalls of each panel. The resulting structure which is comprised of a plurality of such panels is highly effective in reducing the noise generated therein through transmission loss and sound absorption.

It is the principal object of this invention to provide an economical high density sound transmission loss system.

It is another object of this invention to provide a high density sound transmission loss panel which can be joined together with similar panels to form a soundproof enclosure.

It is yet another object of this invention to provide an economical panel for the construction of a soundproof enclosure, which panel is comprised of concrete.

It is still another object of this invention to provide an economical panel for the construction of soundproof enclosures, which panel utilizes concrete which is poured in a manufacturing plant.

It is a further object of this invention to provide a concrete panel for constructing soundproof enclosures, which panels are easily secured to one another in soundproof joints.

These and other objects and advantages of the present invention will become apparent upon the following detailed description taken in conjunction with the accompaying drawings.

IN THE DRAWINGS

Figure 3:
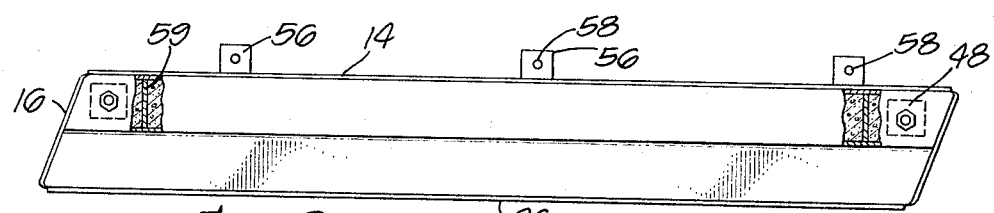
FIG. 3 is a sectional view taken along line 3—3 in FIG. 2.
Figure 4:
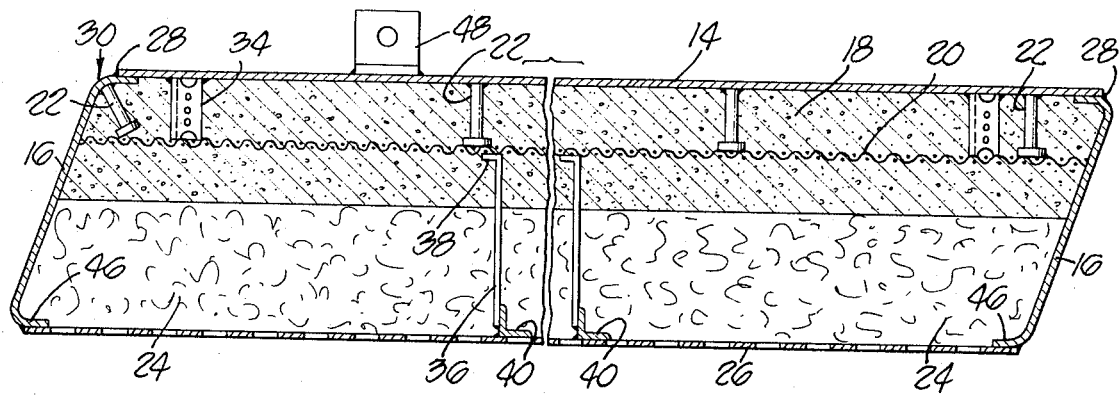
FIG. 4 is a sectional view taken along line 4—4 in FIG. 2.
Figure 5:
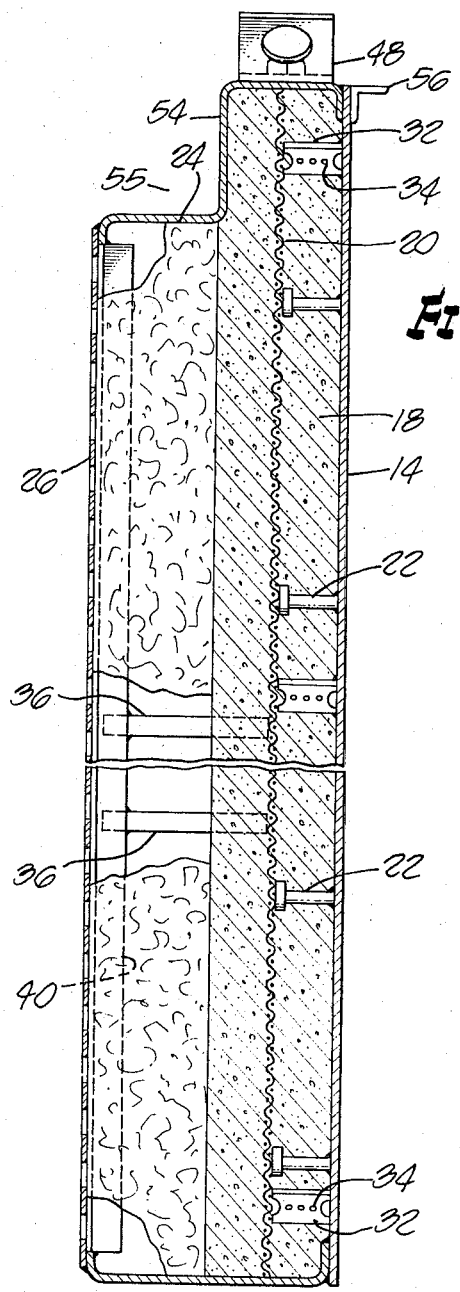
FIG. 5 is a sectional view taken along line 5—5 in FIG. 2.
Figure 9:
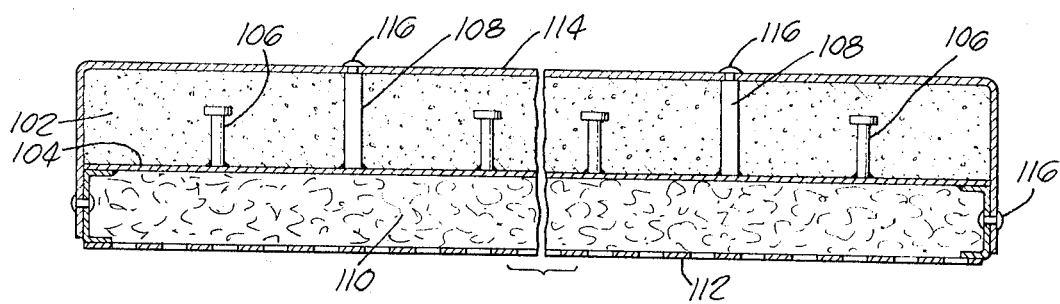

FIG. 9 is a sectional plan view of a third embodiment of the panel. Referring now in detail to the drawings, one embodiment of the invention is shown in FIGS. 1-6. Illustrated therein is a soundproof enclosure 10 which is comprised of a plurality of high density sound transmission loss panels 12. As best seen in FIGS. 4 and 5, each panel is comprised of a steel base plate 14 and side plates 16, a layer of concrete 18 which is reinforced with wire mesh 20 and anchored to the base plate by means of studs 22 which are welded to the base plate and extend into the concrete. A layer of sound absorbing material 24 such as fiberglass is disposed over the concrete layer 18 and an interior perforated sheet 26 is placed over the sound absorbing material and defines the interior surface of the panel.

In the construction of the panel 12, the steel side plates are welded or otherwise affixed to the base plate at 28 to define the outer skin 30 or housing of the panel. A 3/16 inch steel plate has been found to be quite suitable for construction of this outer skin. The reinforcing wire is then disposed within the skin and spaced from the steel plate by means of the anchor studs 22 and supporting chairs 32. In one embodiment of the invention, the reinforcing wire is welded to the extended edge of the studs and supporting chairs are not used. In alternate embodiments, spacing chairs or rebar chairs as they are often called in the trade, are disposed between the reinforcing wire and steel base plate to prevent the reinforcing wire from being displaced during the pouring of the concrete. The concrete is then poured into the skin of the panel about the anchor studs 22 thereby securing the layer of concrete 18 within the skin and setting the reinforcing wire in place. The rebar chairs shown in FIG. 5 are seen to have holes 34 therein which allow the concrete to pass therethrough and thereby form a more solid layer within the panel. By way of example, an eight inch layer of concrete has been found to provide the necessary mass for excellent transmission loss and number 10 inch wire on six centers has been found to provide the necessary tensil strength on the inner side of the panel which is lacking in the concrete. A layer of fiberglass or other sound absorbing material 18 is then disposed within the panel skin over the layer of concrete. Spacers 36 extend between the reinforcing wire and the interior perforated sheet 26 which forms the inner plane of the panel. These spacers have inner flange portions 38 which are adapted to abut the reinforcing wire and outer flange portions 40 which define a support surface for the inner perforated sheet or facing 26. The facing is then secured by welding the facing to the flanged portions 46 of the steel side plates 16 and to the flanged portions 40 of spacers 36. Generally the sound absorbing material extends beyond the side plates 16 and is slightly compressed when the perforated facing is secured. It has been found that by slightly compressing the sound absorbing material the sound absorption properties of the panel are improved.

Figure 1:
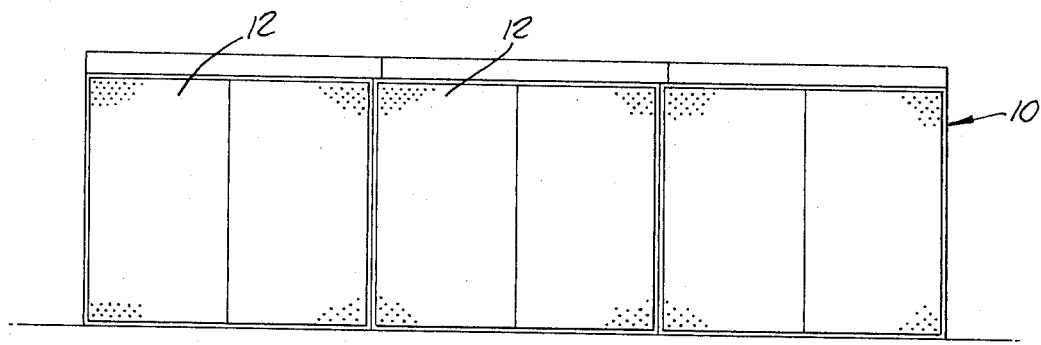
FIG. 1 is a side view of a soundproof enclosure incorporating the soundproof panels.
Figure 2:
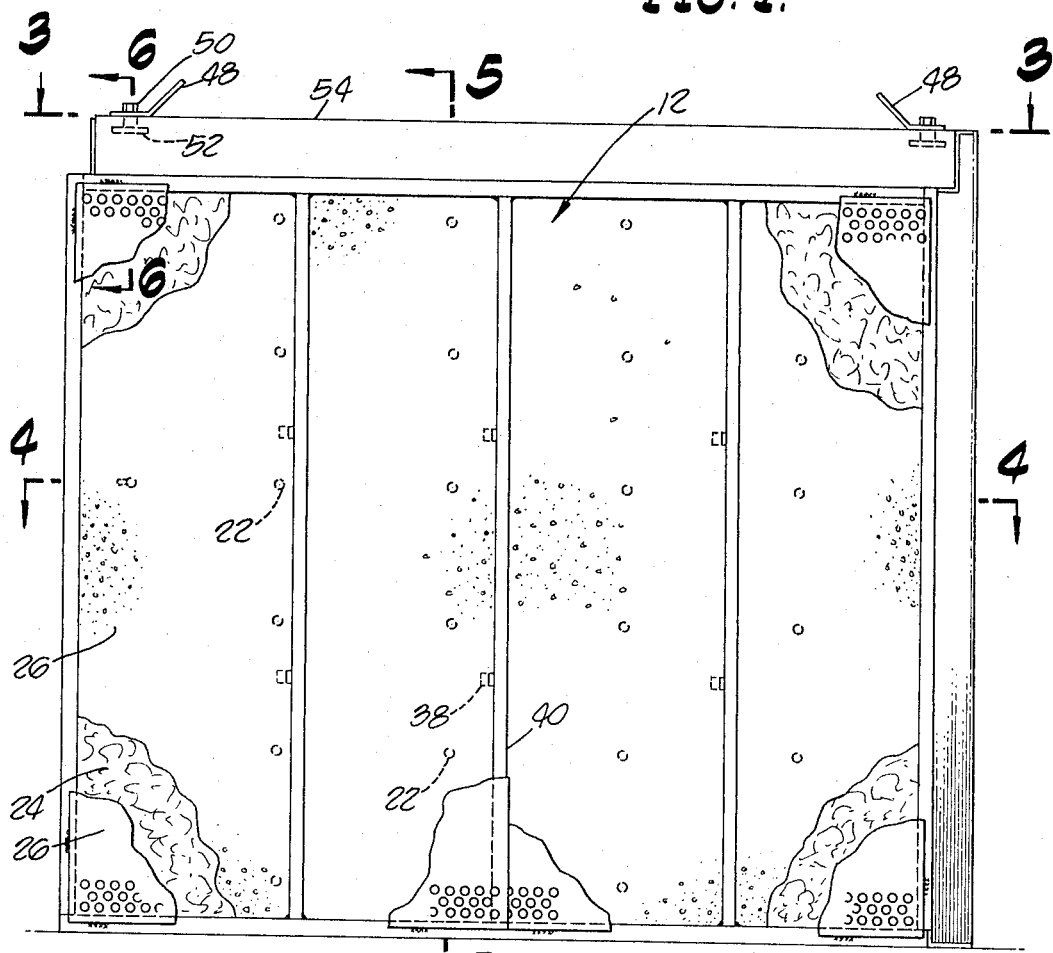
FIG. 2 is a partial sectional view of one embodiment of the soundproof panel.
Figure 6:
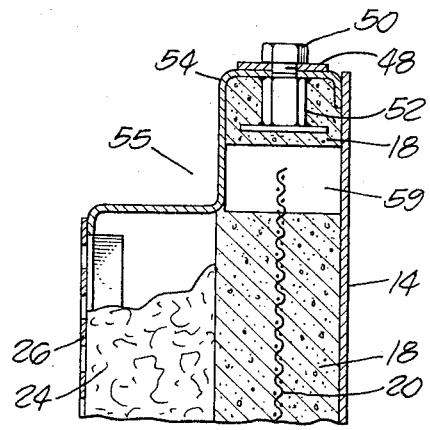
FIG. 6 is a sectional view taken along line 6—6 in FIG. 2.

To facilitate moving the panels 12, lifting lugs 48 are secured thereto by screw means 50 and threaded coupling nuts 52 which are set within the concrete layer of 18 of the panel 12 near the opposite ends thereof as best seen in FIGS. 2 and 6. The individual panels are moved into position for construction of the enclosure 10 by means of these lugs. Once in position, the panels are easily joined together by welding along the abutting surfaces to define a sound tight joint. Stitch welding and caulking can also be utilized for forming such a joint. Through this procedure, one embodiment of the soundproof enclosure and is constructed.

As shown in FIGS. 5 and 6 the top plate 54 is of a step configuration to define a cut away portion 55 for the placement of a roof thereon. Angle irons 56 having apertures 58 therein are disposed along the upper and of the panel for securing of the roof. Prior to placing the roof on the top plates of the panels, the lifting lugs 48 are removed from the panel to prevent interference with the joint between the upper ends of the panels and the enclosure roofing. As shown in FIG. 3 a bar support 59 can be disposed in the upper portion of the panel to added additional strength to the top plate of the panel.

Figure 7:
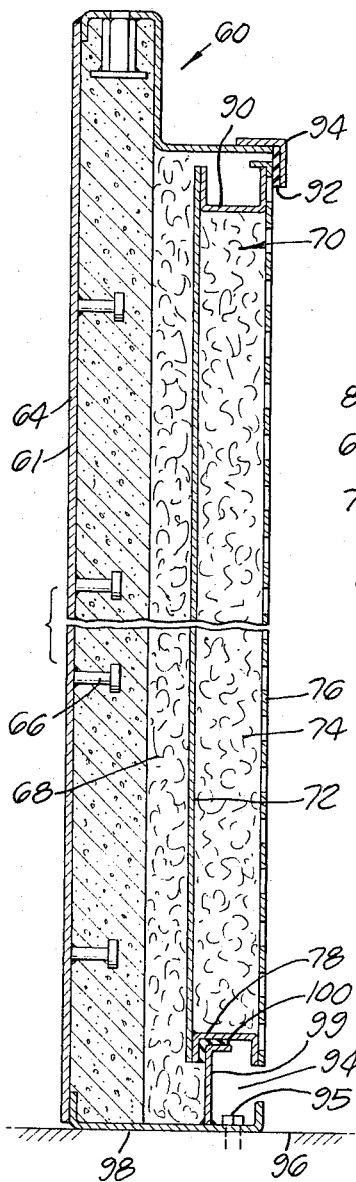
FIG. 7 is a sectional side view of a second embodiment of the panel
Figure 8:
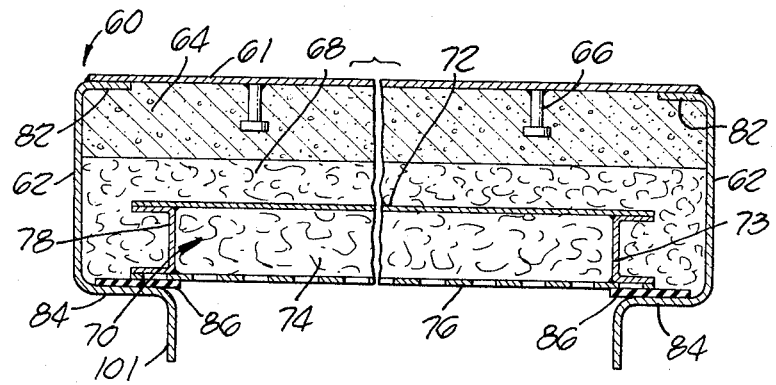
FIG. 8 is a parital sectional plan view of the second embodiment of the panel.

Asecond embodiment of the hgih density sound panel is illlustrated in FIGS. 7 and 8. The panel 60 shown therein varies from the first embodiment in that the second embodiment incorporates a double wall acoustical structure having a floating inner panel. The embodiment shown in FIGS. 7 and 8 represents a typical panel of this second embodiment whichis sued to form a soundproof enclosure such as enclosure 10. This embodimentiscomprised of a base plate 61 and side panels 62, a layer of concrete 64 which, as in the prior embodiment, is anchored to the base plate by means of studs 66. As in the prior embodiment the base plate and end plates are typically 3/16 inch steel plate, while 4 inches of concrete provides a suitable mass for excellent transmission loss in thispanel configuration. Two inches of a sound absorbing material 68 such as fiberglss are disposed over the concrete and an interior panel 70 is floated over the sound absorbing material. This interior floating panel consists of a back sheet of 72 of 18 gauge steel, 4 inches of additional acoustical material 74 and an inner perforated sheeet 76 whichis also preferably constructed of 18 gauge stel. As in the prior emboidment the sound absorbing materialis slightly compressed to improve sound absorption. To float the interior panel 70, the back sheet 72 terminates short of the side plates 62 and is supported at its ends by U-shaped support members 78 which extend betwen the back sheet 72 and the perofrated sheet 76. The steel side plates 62 have flanged portions 82 and 84 at the ends threof, flange portions 82 being welded to the base plate 60 to form the outside skin of the panel. Flange portions 84 on the sie plates extend inwardly of the support member 78 and the ends of th perforated sheet to hold the peforated sheet and back sheet 72 within the skin of the panel as seen in FIG. 8. A neoprene strip 86 is disposed Between the perforated sheet and the flanges 84 of the side plates to prevent metal to metal contact between the inner floating panle 70 and the remainder of the transmission loss panel 60.

As shown in FIG. 7, a similar arragement is provided at the upper and lower ends of the panel 60. As in the prior embodiment, the top plate 88 is of a step configuration to accommodate the roof portion of the enclosure. At the upper end of the panel, the support member 90 is shown terminatingshort of the top plate 88 and the inner perforated facing 76 is bent over the inside leg of the support member. A neoprene strip 92 is disposed between the perofrated facing and a clamp 94 which holds the floating panel 70 in place while preventing metal to metal contact betwen the floating panel and the top plate 88 of panel 60. The lower end of the plate can have the same configuration as the upper end, or as shown in FIG. 7, a recessed area 94 can be provided to accomodate a bolt means 95 to secure the panel to a concrete or other base 96. In this configuration, the U-shaped support member 78 terminates short of the bottom plate 98 and is welded tothe back sheet 72 and perforated facing 76. A flange upright support 99 is welded to the bottom plate a the loer end thereof and a neoprene angle strip 100 is disposed between the flanged portion of the upright suppor 99 and the U-shaped support member 97. In this manner, the inner panel 70 is free to float within panel 60. Other configurations of upper and lower supporting elements, however, could be employed to float the inner panel in the above-described fashion. Additional hardware can be added to the second embodiment of the invention as in the prior embodiment to facilitat inner connecting panels and various joints. As an example, the inner flange portions 84 of the side plates 62 of the panel can be extended outwardly as shown in the drawings to provide an attachment flange 101 for the bolting togehter of adjacent panels. Finally, the individual panels 60 are secured by welding the same fashion as are the panels 12 of the first embodiment to provide a soundproof enclosure such as enclosure 10.

A third embodiment of the high density sound transmission loss panel is shown in FIG. 9. This embodiment differs from the first embodiment in that the layer of concrete 102 is disposed outwardly of the steel base plate 104. In this embodiment the concrete is secured to the steel plate by means of suppor anchors 106 which are welded tothe steel plate. Also structural steel members 100 can be welded to the steel plate which extend outwardly to the outer edge of the panel thereby anchroing the layer of concrete to the plate. A layer of acoustical material 110 is disposed inside the steel sheet and is held there-against by a perforated facing 112. The outside of the panel may be covered with an appearance lagging 114 of aluminum or steel. The outside lagging is secured to the concrete or the steel structural shapes which contain the concrete by means of studs, rivets, or other fateners 116.

Other changes and modifications may be made in carryig out the instant invention without departing from the scope and spirit thereof. Insofar as these changes and modifications are within the purview of the appended claims they are to be considered as part of the invention.

I claim:

1. A high density sound transmission loss panel comprising a steel housing, a layer of concrete disposed within said housing, a layer of sound absorbing material disposed within said housing inwadly of said concrete, an inner perforated sheet, said sheet extending across said housing and being affixed thereto theeby defining the inner facing od said panel.

2. The combination of claim 1 including means for anchoring said concrete within said housing.

3. The combination of claim 1 including reinforcing means disposed within said concrete and means for spacing siad reinforcing means from said housing.

4. The combination of claim 3 including means for supporting said perofrated sheet, said means extending between said reinforcing means and said sheet and having a support surface to which said perforated sheet is secured.

5. A high density sound transmission loss panel comprising a housing having steel base and side walls, a layer of concrete disposed within said housing against said base plae, a plurality of studs secured to said base plate and extending into said layer of concrete to anchor said concrete to said base plate, reifnorcing means disposed within said layer of concrete, a layer of sound absorbing material disposed within said housing adjacent said layer of concrete, an inner perforated sheet, said sheet extending across said housing and being secured to said side walls thereby defining the inner facing of said panel and means for supporting said perforated sheet extending between said reinforcing means and said sheet and having a support surface to which said perorated sheet is secured.

6. The combination of claim 5 inlcuding additional means extending between said base and said reinforcing means for spacing said base 7. The combination of claim 5 wherein said reinforcing means comprises a layer of reinforcing wire, said wire being spaced from said base by said studs.

8. The combination of claim 7 including a pluality of lifting lugs, said lugs being secured to the upper ends of said panel by means of threaded coupling nuts, said nut being secured within said concrete and adapted to receive bolt means through the upper side wall of said housing.

9. The combination of claim 5 wherein said layer of sound absorbing material is compressed between said layer of concrete and said inner perforated sheet.

10. A high density sound transmission loss panel comprising a housing having a steel base and side walls, a layer of concrete disposed within said housing, a first layer of sound absorbing material disposed within said housing inwardly of said concrete, a steel back sheet disposed inwardly of said first layer of sound aboring material and spaced from said panel side walls, a second layer of sound abosrbing material disposed within said housing against said back sheet and an inner perforated sheet disposed agains said second layerof sound absorbing material and extending across said housing thereby defining the inner facing of said panel.

11. The combination of claim 10 including means for supporting said back sheet and said perforated sheet, said means being moveable with respect to the side walls of said panel thereby defining an inner floating panell comprised of said back sheet, said supporting means and said perforated sheet.

12. The combination of claim 11 including means for anchoring said layer of concrete within said housing.

13. The combination of claim 12 wherein said first layer of sound absorbing material is compressed between said layer of concrete and said back sheet and said second layer of sound absorbing material is compressed between said back sheet and said perforated sheet.

14. A high density sound transmission loss panel comprising a housing having steel base and side walls, a layer of concrete disposed within said housing against said base plate, a plurality of studs secured to said base plate and extending into said layer of concrete to anchor said concrete to said base plate, a first layer of sound absorbing material disposed within said housing adjacent said layer of concrete, a steel back sheet disposed within said housing and pressing against said first layer of sound absorbing material, said sheet being spaced from said panel side walls, a second layer of sound absorbing material disposed within said housing on the opposite side of said back sheet from said first layer of sound absorbing material, an inner perforated sheet disposed against said second layer of sound absorbing material and extending across said housing thereby defining the inner facing of said panel and support members extending between and secured to said perforated facing and said back sheet, said back sheet, supporting members and perforated sheet defining an inner floating panel within said high density sound transmission loss panel.

15. The combination of claim 14 wherein said support members are U-shaped, the arms of said members being secured to said back sheet and said perforated sheet and the bar portion of their portions thereof defining the side walls of said inner floating panel.

16. The combination of claim 15 including spacing members disposed between said inner panel and said steel panel side walls to prevent any metal to metal contact therebetween.

17. A high density sound transmission loss panel comprising a steel base plate, a layer of concrete disposed on said base plate, a plurality of studs secured to said base plate and extending into said layer of concrete to anchor said concrete to said base plate, a layer of sound absorbing material disposed against the said base plate on the opposite side thereof from said concrete, an inner perforated sheet disposed against said sound absorbing material and defining the inner facing of said panel and means for securing said perforated sheet to said base plate.

18. The combination of claim 17 wherein said securing means are U-shaped support members, said members extending between said base plate and said perforated plate and including an outer housing disposed about said concrete and said sound absorbiing material, said housing being carried by said concrete.

* * * * *